United States Patent [19]

Woodruff

[11] Patent Number: 4,655,432
[45] Date of Patent: Apr. 7, 1987

[54] CABLE DISPENSING METHOD

[76] Inventor: Harold F. Woodruff, 2340 Avocado Ter., Hacienda Heights, Calif. 91745

[21] Appl. No.: 738,538

[22] Filed: May 24, 1985

Related U.S. Application Data

[63] Continuation of Ser. No. 154,609, May 30, 1980, abandoned, which is a continuation-in-part of Ser. No. 124,132, Feb. 25, 1980, Pat. No. 4,331,322.

[51] Int. Cl.⁴ ............................................. B65H 59/00
[52] U.S. Cl. ................................................ 254/134.3 FT
[58] Field of Search ............... 254/134.3 FT, 134.3 R; 184/15 R; 15/104.3 SN; 198/993, 500; 406/47, 49, 193; 405/171; 175/65; 308/6 R, 6 A

[56] References Cited

U.S. PATENT DOCUMENTS

| 2,498,834 | 2/1950 | Bennett et al. . | |
|---|---|---|---|
| 2,532,504 | 12/1950 | Lapsley | 254/134.3 R |
| 2,946,558 | 7/1960 | Ferm . | |
| 3,132,416 | 5/1964 | Hait . | |
| 3,165,277 | 1/1965 | Nordlof et al. . | |
| 3,202,376 | 8/1965 | Dutro et al. . | |
| 3,239,161 | 3/1966 | Dutro et al. . | |
| 3,363,879 | 1/1968 | Irik | 254/134.3 FT |
| 3,400,542 | 9/1968 | Davis . | |
| 3,494,443 | 2/1970 | Huffhines . | |
| 3,558,074 | 1/1971 | Heid . | |
| 3,658,270 | 4/1972 | Slator et al. . | |
| 3,763,722 | 10/1973 | Ehrens | 254/134.3 FT |
| 3,788,575 | 1/1974 | Boettcher et al. . | |
| 3,858,849 | 1/1975 | Peirce . | |
| 3,879,659 | 4/1975 | Lawson, Jr. . | |
| 3,912,225 | 10/1975 | Earnheart | 254/134.3 R |
| 3,941,324 | 3/1976 | Green . | |
| 3,982,402 | 9/1976 | Lang et al. . | |
| 4,012,001 | 3/1977 | Knox | 254/134.3 R |
| 4,063,617 | 12/1977 | Shenk | 184/15 R |
| 4,083,532 | 4/1978 | Pola | 254/134.3 FT |
| 4,085,904 | 4/1978 | McElroy . | |
| 4,101,114 | 7/1978 | Martin . | |
| 4,278,238 | 7/1981 | Vugrek | 254/134.3 FT |
| 4,296,837 | 10/1981 | Charlton | 184/15 R |
| 4,331,322 | 5/1982 | Woodruff | 254/134.3 FT |
| 4,412,673 | 11/1983 | Ramsden et al. | 254/134.3 FT |

Primary Examiner—Robert C. Watson
Attorney, Agent, or Firm—Sheldon & Mak

[57] ABSTRACT

Long lengths of large diameter electric cable can be laid in underground ducts by supporting each cable to be laid in the duct on its own rotatable reel, introducing the cables simultaneously and separately from the reels to the duct, lubricating the cables, and pulling the cables simultaneously through the duct. A guide is used for introducing the cables into a conduit such as the duct and lubricating the cables. The guide comprises a body portion sized to fit within the conduit, the body having a plurality of longitudinal channels along its periphery for forming a plurality of spaced-apart cable guide passages in cooperation with the internal wall of the conduit. A lubricant can be introduced into each channel.

6 Claims, 8 Drawing Figures

CABLE DISPENSING METHOD

CROSS-REFERENCE

This application is a file wrapper continuation of application Ser. No. 154,609, filed on May 30, 1980 now abandoned, which is a continuation-in-part of application Ser. No. 124,132 now U.S. Pat. No. 4,331,322 filed Feb. 25, 1980, entitled "Cable Laying Apparatus", which is incorporated herein by this reference.

BACKGROUND

The present invention is directed to apparatus for lying elongated articles in conduits such as for laying electrical cables in underground ducts.

Electric utilities lay large quantities of cables in underground ducts. Generally three cables are laid simultaneously for 3-phase electrical power. A typical duct has an internal diameter of about 4 to 6 inches, and the cable diameter typically is about 1⅜ inches for 350,000 circular mil cable, and about 1¾ inches for 750,000 and 1,000,000 circular mil cable.

A common method for handling underground cable is the use of single reels with a single cable wound on each reel. The problem with this technique is difficulty in dispensing cable from three reels simultaneously into the duct and pulling long lengths of cable. Further, massive equipment is required. Method and apparatus for laying cable with this technique are described in U.S. Pat. Nos. 2,498,834, 2,532,504, 3,363,879, and 4,101,114, the disclosures of which are incorporated herein by this reference.

In order to overcome these problems and lay three cables simultaneously, cable manufacturers provide three lengths of cables helically twisted about each other into what is commonly referred to as a "triplex" cable. To lay the triplex cable, it is pulled through the conduit by means of a rope. At the feed end of the conduit, a split bell is provided for guiding the triplex. The bell is conventionally provided with a grease-fitting for radially inward introduction of lubricant to aid in pulling the triplex cable through the conduit.

There are many problems with this type of system. For example, it is difficult to pull the triplex cable through a conduit because the lubricant is applied only on the exterior surface of the cables. The high pulling forces required can stretch the cables, resulting in broken strands and line discontinuities. Another disadvantage of triplexing is that it is expensive, costing about 15 to 20 cents per linear foot.

A further disadvantage of the triplex cable system is that there can be substantial wastage of cable. If 600 feet of triplex are ordered, but only 500 feet are actually required, there are 100 feet of the triplex cable left over. This leftover triplex cable has little, if any use, because it cannot be splied to other triplex cable because a large splice cannot be pulled through a conventional underground duct.

Another problem with triplex cable is that most manufacturers supply it only in lengths up to about 900 feet, because that is the maximum that can be placed on a single reel. Therefore, for lengths longer than 900 feet, it is necessary to build splicing vaults into the underground duct system. The splicing vaults are expensive to construct, the labor for forming the splices is expensive, and the splices are often a source of line discontinuities.

In view of the problems associated with pulling triplex cable through a duct, it is evident that there is a need for a system that allows three cables to be laid in a duct easily, inexpensively, and with less waste cable.

SUMMARY

The present invention is directed to a system for laying cable in a duct that allows something to be done that has never been done before. Namely, it is now possible to lay long lengths of a plurality (at least two) of separate cables in a duct. The present invention can be used for laying lengths of cable in excess of 1,500 feet.

This is achieved by supporting each of the cables on its own rotatable reel and feeding each of the cables simultaneously and separately from the reels to the duct. The cables are lubricated and pulled simultaneously through the duct. By supporting the cables independently and by lubricating the cables so that they can slide through the duct, and particularly by lubricating the internal surfaces of the cables, the need for triplexing cables has been eliminated, and lengths of cables in excess of 1,500 feet can be pulled, including through ducts containing at least one bend of at least 90°. The "internal" surface of a cable is the surface that is adjacent another cable rather than the internal wall of the duct.

Preferably the apparatus for supporting the cable comprises a mandrel and at least a reel for each cable, each reel being independently supported by the mandrel for rotation thereon, each reel being capable of rotating at a speed different from the speed of rotation of the other reel so that the cables can be pulled around bends.

To attain the economic advantages of this invention, preferably the cables are layed in lengths of at least 500 feet, more preferably at least 1,000 feet, and most preferably at least 1,500 feet.

For ease in securing a cable to a reel of the apparatus, preferably an elongated chamber is provided along a chord of the core of each reel, the chamber being of sufficiently large diameter for securing an end of a cable therein. To secure a cable to the reel, the end of the cable is placed in the chamber, and is clamped in position by fastening means that extend adjustably into the passageway.

For lubricating the cables and guiding them into a duct or conduit, a guide comprising a body portion sized to fit within the conduit is provided. The body has a plurality of longitudinal channels along its periphery for forming a plurality of circumferentially spaced-apart, longitudinally extending cable guide passages in cooperation with the internal wall of the conduit. The channels are sufficiently large that a cable can be pulled through each guide passage. The body is provided with means for introducing lubricant into each channel. This can be a lubricant duct extending longitudinally along the body with at least one lubricant passage or tube from the lubricant duct to each channel.

In use, the guide is placed into the conduit, thereby forming a plurality of spaced-apart guide passages. At least two cables are placed in the guide, each placed cable being in a separate guide passage. Lubricant is introduced into each passage and the guides are pulled through the conduit.

With the guide of the present invention, it is possible to introduce lubricant radially outwardly into each guide passage so that the internal surfaces of the cables, which rub against each other, are lubricated. In addition, lubricant can be introduced axially into the conduit and radially inwardly onto the external surfaces of the cables.

The present invention overcomes the problems associated with the prior art triplexing system and greatly reduces costs associated with laying cable in underground ducts.

Because of the radially outward introduction of lubricant into the guide passages, it is easy to pull the cables through the duct. It is no longer necessary to triplex a cable because each of the three cables is provided on a separate reel and can be pulled individually and simultaneously into the duct. This eliminates the cost of triplexing and the wastage incurred with scrap triplex cable. Further, because very long lengths of cable can be pulled, splicing vaults are eliminated and splices, which can be source of line discontinuities, are no longer needed.

DRAWINGS

These and other features, aspects, and advantages of the present invention will become better understood with reference to the following description, appended claims, and accompanying drawings where:

Figure 8:
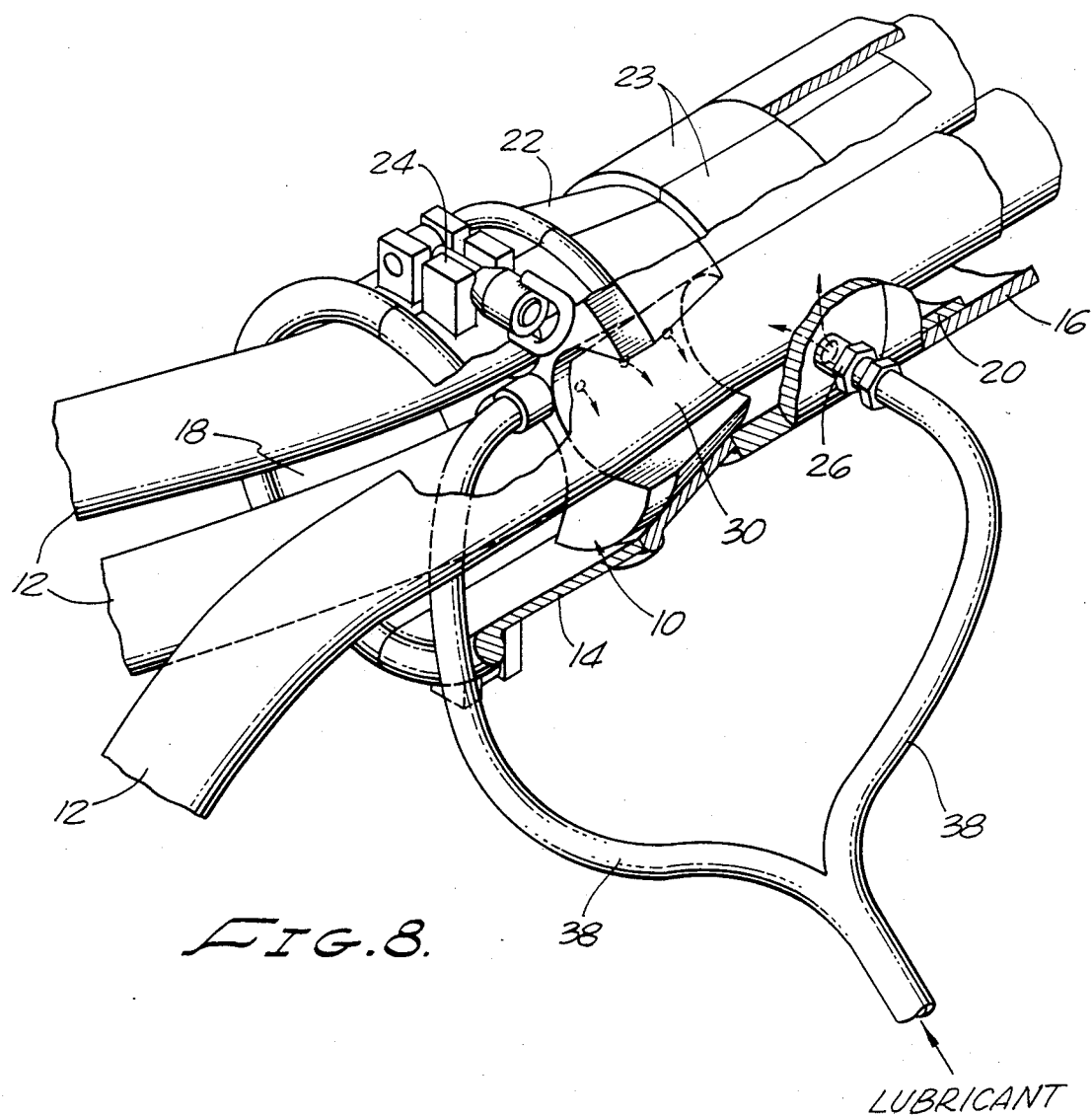
Figure 7:
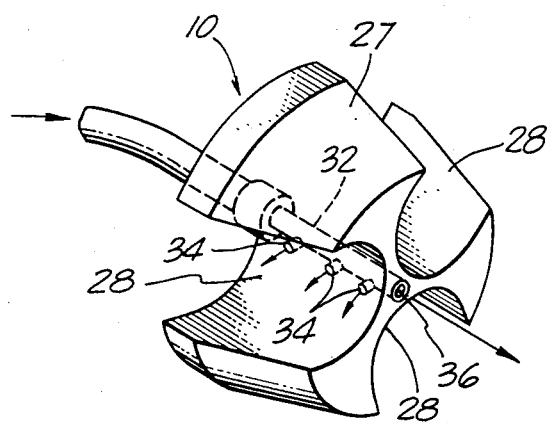
FIG. 7 is a perspective view of a guide according to the present invention.

FIG. 8 schematically shows the guide of FIG. 7 being used for guiding three cables into a duct.

DESCRIPTION

Figure 1:
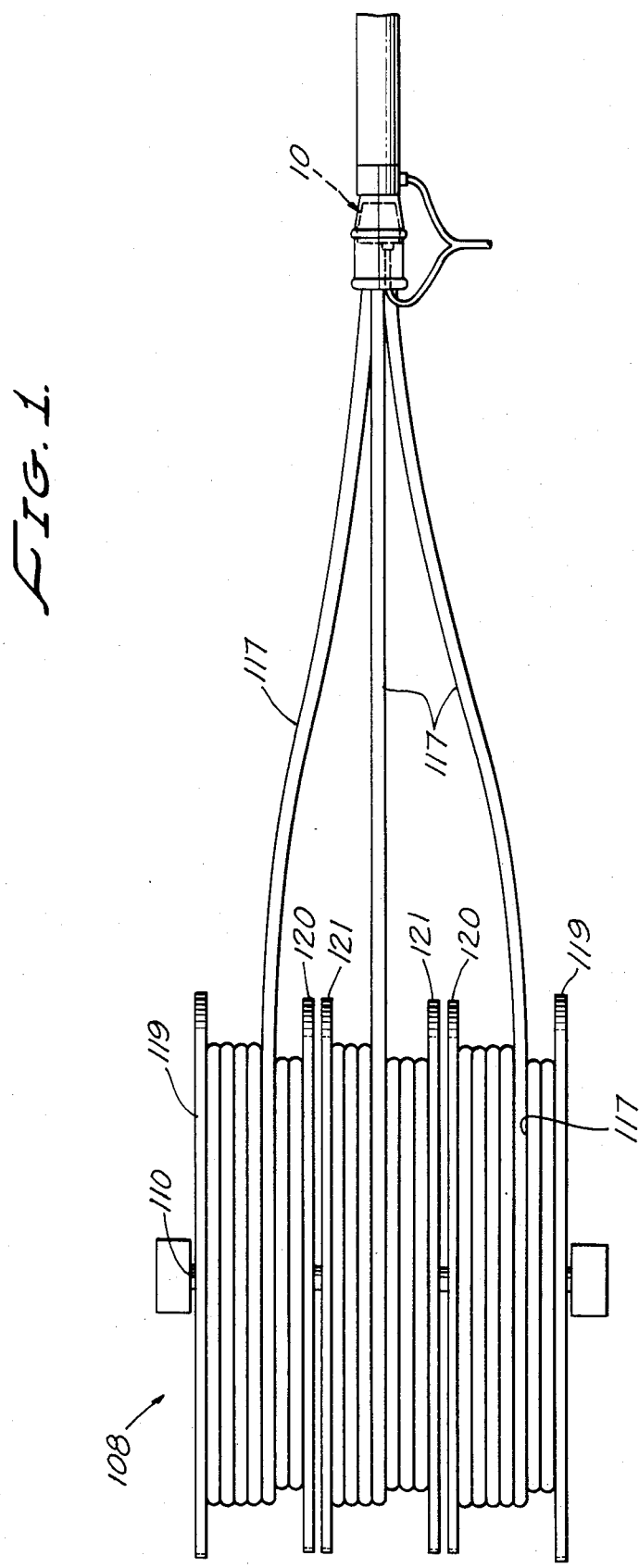
FIG. 1 is a fragmentary plan view showing a method according to the present invention for installing cable.
Figure 2:
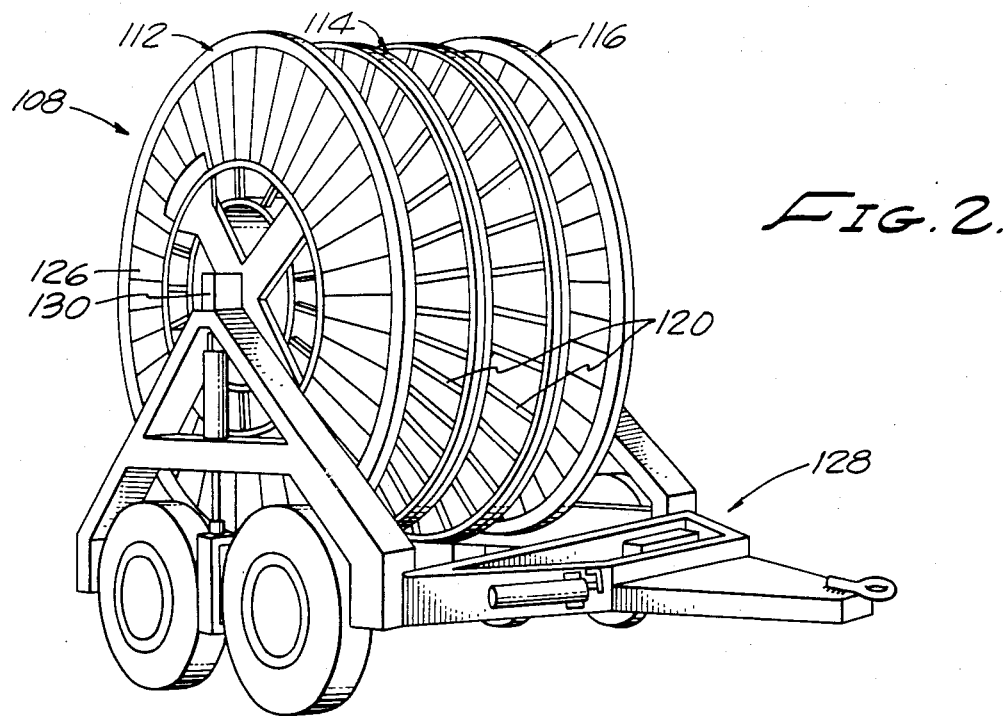
FIG. 2 is a perspective view of an apparatus for dispensing cable with three reels mounted thereon, the apparatus being supported on a dolly.
Figure 3:
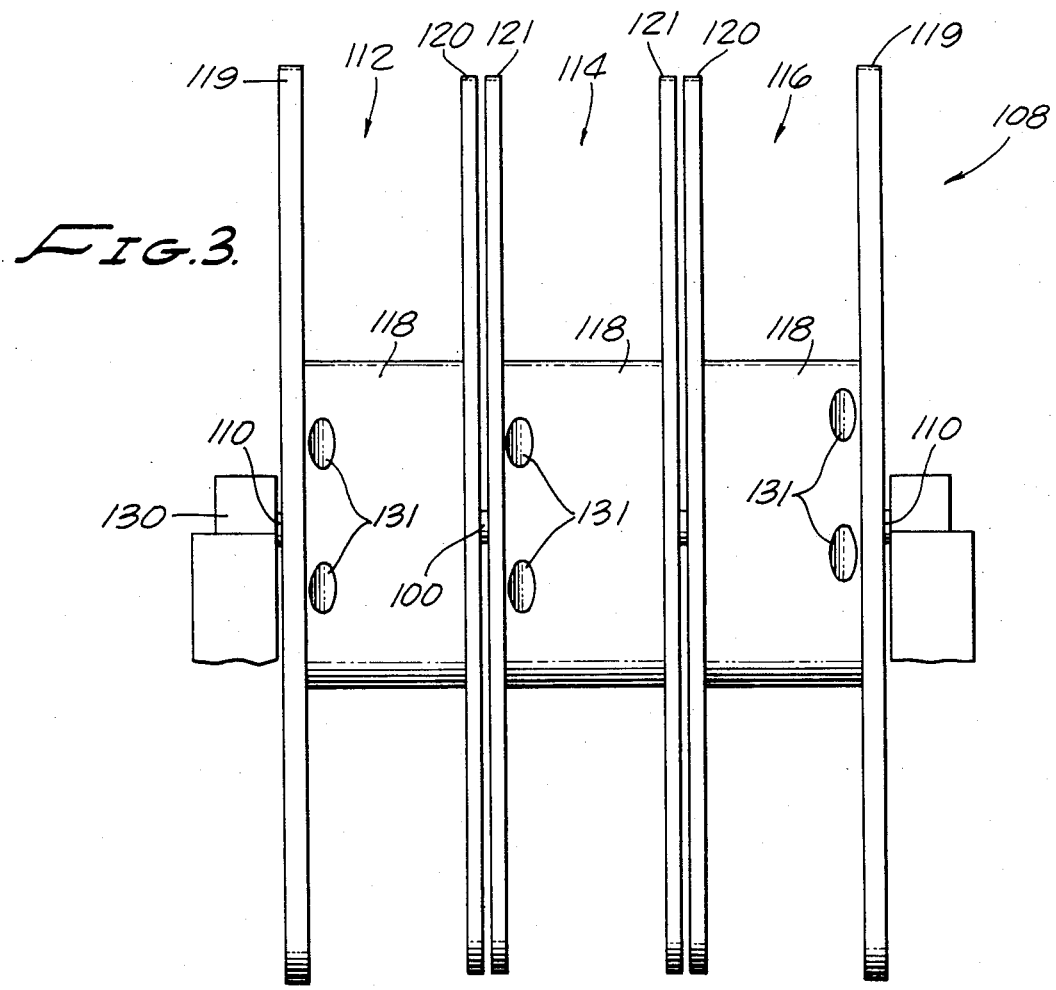
FIG. 3 is a front view of the cable dispensing apparatus of FIG. 2.

With reference to FIGS. 1 and 2, an apparatus 108 for dispensing cable according to the present invention comprises a horizontally extending mandrel 110 on which are mounted three reels side-by-side, from left to right as shown in FIG. 3, an end reel 112, a middle reel 114 and another end reel 116. The reels are shown in FIG. 1 with cable 117 wound thereon. Each reel comprises a hollow core or hub 118 and a pair of rims. Each of the end reels 112 and 116 has an end rim 119 and an internal rim 120, and the middle reel has two rims 121. The rims 121 of the middle reel 114 and the internal rims 120 of the end reels 112 and 116 are supported by spokes 122 constructed from square tubing. The spokes can be used for securing cable to the reels and reduces the weight of the apparatus 108. The end rim 119 of each of the end reels 112 and 116 is supported by ribbed flanges 126.

The diameter of the outer rims 119 of the end reels 112 and 116 is slightly larger than the diameter of the rims 121 of the middle reel 114 and the internal rims 120 of the end reels 112 and 116. Thus, when the cable dispensing apparatus 108 is on the ground, only the outer rims 119 touch the ground for ease in manipulating the apparatus.

Each reel is mounted on the mandrel 110 and secured in its relative position by a pair of roller bearings (not shown) lubricated by means of zerk-grease fitting. The reels are mounted side-by-side adjacent to each other in as close proximity as possible to minimize the size of the cabe dispensing apparatus and to permit the reels to be locked together as described below. The reels are mounted to be able to rotate independently on the mandrel. The mandrel 110 is longer than the combined widths of the reels so that mandrel 110 can be supported.

As shown in FIG. 2, one means for supporting the mandrel off the ground is a towable wheeled dolly 128 provided with a support saddle 130 for each end of the mandrel 110.

Figure 4:
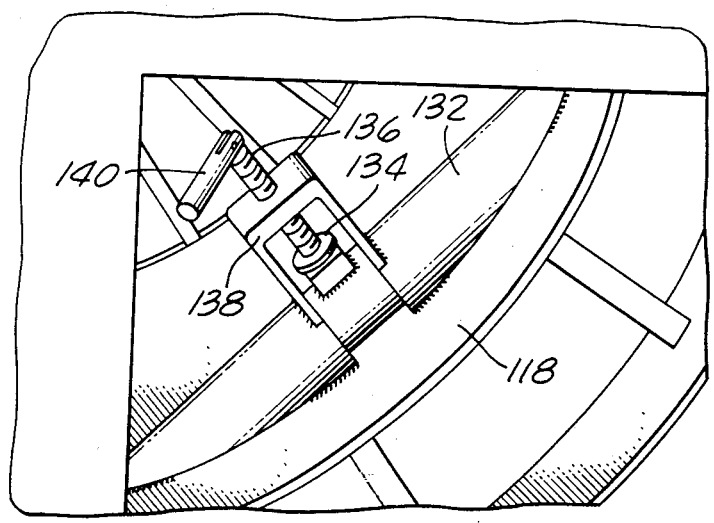
FIG. 4 shows a tubular chamber for securing a cable to an end reel of the apparatus of FIG. 2.
Figure 5:
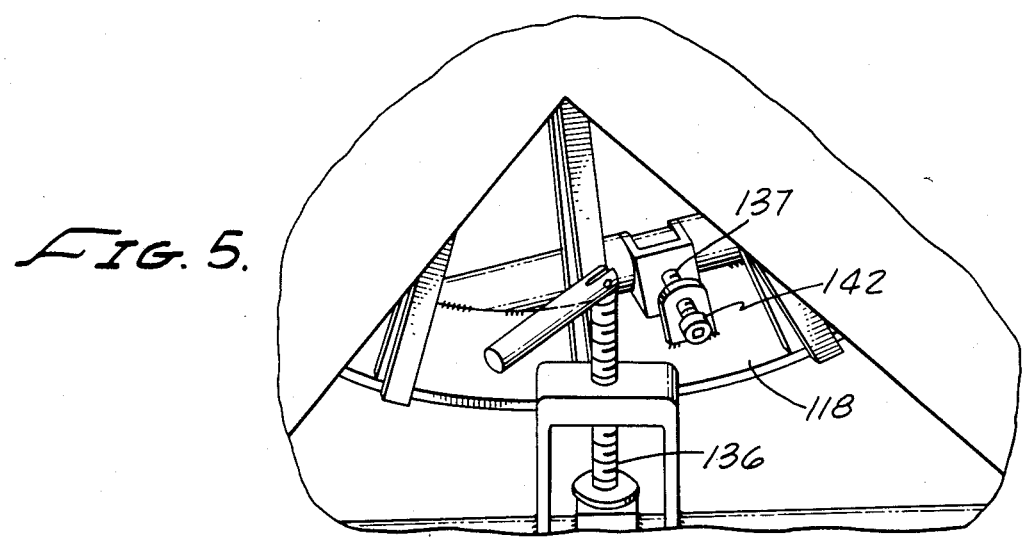
FIG. 5 shows a tubular chamber for securing a cable to the middle reel of the apparatus of FIG. 2.

In addition to tying a cable to the spokes of the reels in the conventional manner, novel means are provided for securing the cables 117 to the core 118 of the reels. Each core 118 is provided with two openings 131 in its exterior surface, spaced circumferentially apart around the core a short distance from each other, i.e. in the order of from about 40° to about 60°. As shown in FIGS. 4 and 5, the holes are connected to each other by a section of pipe 132 that forms a tubular chamber or passageway through the core. The pipe is of sufficiently large diameter to accommodate a cable. The pipe is along a chord of the hub, the chord being that subtended by a central angle of from about 40° to about 60°.

With reference to FIG. 4, a portion 134 of the pipe 132 is cut out and secured to the end of a threaded clamp screw 136 that is mounted in a bracket 138 so that it can move radially relative to the pipe 132 and the mandrel 110. The screw 136 is provided with a handle 140 for ease in turning. The bracket 138 is secured to the exterior of the pipe 132.

In use, a cable is inserted through one of the openings 130 into the pipe 132 and is clamped in position by turning the screw 136 so that the cut-out portion 134 of the pipe presses the cable against the internal wall of the pipe.

In an alternate version, only one opening 130 is provided in the core leading to the pipe 132. Although this can be used satisfactorily for securing cable to a reel, it has the disadvantage that the cable can be wrapped around the reel from only one direction.

As shown in FIG. 5, because the middle reel 114 is relatively inaccessible, its clamp screw 137 is not provided with a handle 138, but rather is provided with an extension socket 142 and extends parallel to the mandrel 110. Thus, with a socket wrench, a cable can be clamped in position on the middle reel.

This method for securing and attaching cables to a reel is superior to the prior art methods of tying a cable to the spoke of a reel. It is not necessary to bend the cable as in the prior art method, and it is possible to tie the cable from either direction due to the provision of the two openings 131. Further, the end of the cable does not extend beyond the reel as in the prior art method. The combination of bending the cable plus having an end of the cable extend beyond the spokes in the prior art method can result in damage to the cable, providing a source for water leakage. With this novel method for securing cables, it is possible to mount a reel in A-frame without concern that the tied down end of the cable will interfere with rotation in the A-frame. Further, tying the cable to a spoke of a reel is a difficult and time consuming task. It is much simpler just to place the cable in the pipe 32 and tighten down with the clamp screw 136.

The apparatus for securing a cable to a reel shown in FIGS. 4 and 5, and the method for using this apparatus are not limited to the cable dispensing apparatus 108, but can be used with a single reel.

It is important that the three reels 112, 114, and 116 be mounted so that they can rotate and turn independently of one another. Thus, when three cables from the reels are attached together and secured to the rope which is used to pull them through a duct, each cable can act independently of the other in relation to the distance it travels when being pulled through the duct. This is particularly important when the cable is pulled around bends, particulary 90° turns. Without this ability, the cables would tend to jam up when being pulled by the cable-pulling equipment.

Figure 6:
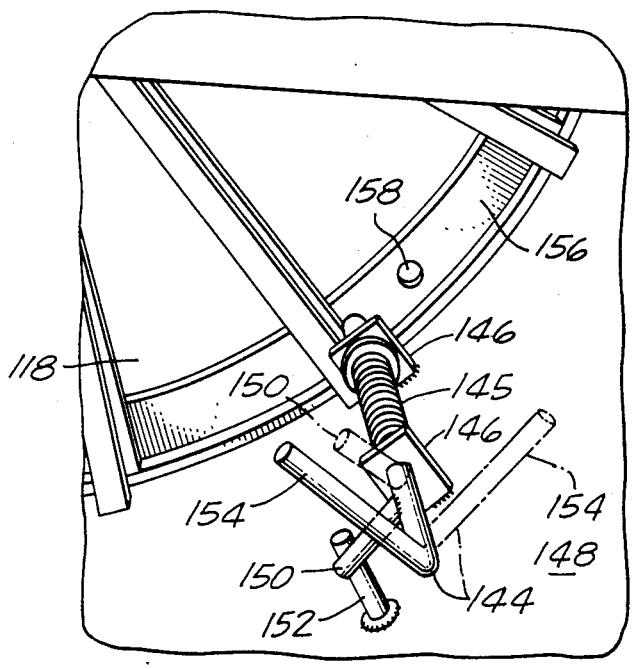
FIG. 6 shows the detail of a device used for securing the reels of the apparatus of FIG. 2 together so that the reels rotate at the same speed.

In some situations, it is desirable that the three reels rotate in unison, as for example, when winding cable onto the reels. For this purpose, each of the outer reels 112 and 116 is provided with a mechanism for locking the outer reel to the middle reel 114. With reference to FIG. 6, the mechanism comprises a rod 144 extending parallel to the mandrel axis and mounted in two brackets 146 attached to the internal surface of the hub 118. The rod 144 is biased toward the middle reel 114 by a coil spring 145 that is mounted on the rod between the two brackets 146. The rod 144 is slideably and rotatably mounted in the brackets 146.

To hold the rod 144 in a cocked position away from the middle reel 114 is provided with a retaining arm 150. When the rod is in the position shown in FIG. 6, the retaining arm is held against a retaining pin 152 extending radially inwardly from the inner surface of the core 118. To release the rod 144 towards the middle reel 114, the rod is turned by a handle 154 that extends perpendicular to the rod so that the retaining arm 150 no longer engages the pin 152 as shown in phantom in FIG. 6. Then the coil spring 148 moves the rod towards the middle reel 144.

Both ends of the internal surface of the hub 118 of the middle reel 114 are provided with a circumferential flange or plate 156 provided with a plurality of holes 158 of sufficient diameter that the rod 144 can slide therein. After the rod 144 is released, the middle reel and/or the end reel can be rotated until the rod 144 engages one of the holes 158, thereby securing the middle and end reels together.

The cable dispensing apparatus 108 is used by winding the desired length of cable on each reel. The apparatus 108 is transported to the location of the underground duct such as by use of the dolly 128. The cables are attached together and secured to a rope which is used to pull them through the duct according to conventional techniques as described in U.S. Pat. Nos. 2,498,834, 2,532,504, 3,363,879, and 4,101,114. At the entrance to the duct, a guide mounted in a bell as described in the aforementioned U.S. patent application Ser. No. 124,132 is used for guiding the cables into the duct and for lubricating the cables. The rope is then pulled using conventional techniques. Preferably drive means coupled to the reels are provided for rotating the reels in response to the pulling force on the cables to assist in laying the cables in the duct. By "directly" rotating a reel, there is meant positively driving a reel to rotate rather than just relying on a pulling force on a cable to cause the reel to rotate. This reduces the tension on the cable, which can help prevent damage to the cable jacket and resulting discontinuities.

FIGS. 7 and 8 show a guide 10 for simultaneously laying a plurality of cables 12 in a conduit. The conduit shown in FIG. 8 comprises a hollow feed bell 14 and an underground duct 16. The hollow bell 14 is a bell conventionally used for feeding triplex cable into an underground duct. One end 18 of the bell has a relatively large diameter and the opposite end 20 has a relatively small diameter. The small diameter end 20 is sufficiently small to slide into the duct 16. The large diameter end 18 is sufficiently large that the cables 12 can be introduced thereinto without difficulty. The body portion 22 of the feed bell is tapered from the large diameter end 18 to the small diameter end 20. The body 22 of the bell is split longitudinally into two sections 23 held together by a conventional toggle apparatus 24. The bell is provided with at least one fitting 26 for introduction of lubricant into the interior of the bell in a radially inwardly direction.

The body 27 of the guide 10 is sized to fit within the bell 14, being tapered to conform to the taper of the body 22 of the bell 14.

The body 27 of the guide is provided with a plurality of longitudinal channels 28 along its periphery. As shown in the figures, the guide 10 generally has three channels 28, one for each of the electrical cables typically laid in an underground duct. When the guide 10 is placed within the bell, the channels cooperate with the internal wall of the bell to form cable guide passages 30. The guide passages 30 are sufficiently large so that cable can be fed through each passage.

The guide 10 is provided with a lubricant duct 32 coaxial with the longitudinal axis of the duct. To provide lubricant to each passage 30, three tubes 34 extend from the duct 32 radially outwardly to each passage 30. The tubes 34 are longitudinally spaced apart from each other so that lubricant can be continuously introduced and injected along the length of the entire passage 30. The lubricant duct 32 extends along the entire length of the guide 10 so that lubricant can be continuously introduced and injected axially into the bell 14 from the open end 36 of the lubricant duct 32.

With reference to FIG. 8, to use the guide 10, it is placed into the feed bell 14. This can be accomplished by opening the two sections 23 of the feed bell, placing the guide 10 between the two sections, and then closing the sections 23 together. Then the bell 14 with the guide 10 therein is placed into the duct 16.

The cables 12 are then placed into the bell through the passages 30 formed by the channels 28 and the internal wall of the bell. A lubricant supply tube 38, which can be formed of flexible rubber, is connected to the fitting 26 of the bell and to the lubricant duct 32 at the large diameter end 18 of the bell 14. While lubricant is being introduced, the three cables 12 are pulled simultaneously through the bell and the duct 16.

The lubricant used can be any lubricant conventionally used when pulling cable through a duct. A preferred lubricant for use in the present invention is a water-soluble, easily removed lubricant which does not affect the cable, such as Hydralube Blue available from Arnco of Youngstown, Ohio.

The guide can be made of any material that is not adversely affected by the lubricant, that does not hamper the pulling of the cables 12 through the duct, and that does not adversely affect the cables 12. The guide can be made of metal such as steel or a strong polymeric material such as polyethylene.

A guide 10 in accordance with the present invention has a length of about 3¼ inches, a diameter at its large end of about 7 inches, and a diameter at its small end of about 4½ inches. Its exterior is uniformly tapered. The channels 28 at the exterior surface of the guide 10 are about 2½ inches across. The channels are cut so that at the bottom they are not tapered, i.e., a line along the bottom of each channel is parallel to the longitudinal axis of the guide. The duct of each channel at the small end of the guide is about 2 inches and at the large end of the guide about 2¾ inches. Such a guide is useful for laying three 1,000,000 circular mil cables simultaneously in an underground conduit, each of the cables having a diameter of about 1¾ inches.

By use of the method and cable dispensing apparatus, including the guide, of the present invention, long lengths of a plurality of cables can be placed in a duct, where the diameter of the duct is no greater than the combined diameters of the cables. For example, three 1,000,000 circular mil cables, each about 1¾ inches in diameter, and each about 2,375 feet in length have been successfully placed by this method in a straight underground duct of internal diameter of about 5 inches. The combined diameter of the three cables is 5¼ inches (3× (1¾)), which is greater than the diameter of the duct. The method of the present invention can easily be used for laying cables in economical lengths heretofore not achieved, including lengths in excess of 500, 1,000, and 1,500 feet.

By using the cable dispensing apparatus and guide of the present invention for simultaneously laying three cables in an underground conduit, many of the disadvantages of the prior art triplex system are eliminated. For example, the cost of winding three cables in a helix is not incurred. Furthermore, the cables can be easily pulled in a duct, because lubricant is introduced radially inwardly, radially outwardly and axially onto the cables. The amount of waste cable is reduced because left over cable, since it is not wound about other cable as part of a helix, can be reused.

Other advantages of using the guide of the present invention include less axial elongation and less chance of breaking strands of the cable due to the improved lubrication, and particularly the internal lubrication of the cables. This results because less force is needed for pulling the cables.

A further advantage of the present invention is that long lengths can be pulled without requiring splicing. For example, three cables, each 2100 feet in length, each being on its own reel, can be used to lay cable in a 2100 feet underground duct. If a conventional triplex cable system were used, it would be necessary to lay at least two separate lengths of triplex cable with a splice between the individual lengths. Such a splice would require expensive labor, and a costly concrete splicing vault.

Other advantages of tHe present invention are more economical and logical installation of underground cables. Present methods require preordering triplex cables of desired length substantially in advance of what is actually to be placed in a duct. With the method of the present method, a single cable can be cut to desired lengths after all underground structures are in, which permits more accurate measurement of the necessary length. By using large master reels of single conductor cable, desired lengths can easily be cut. This also reduces the storage area required for cables.

Another advantage of the cable dispensing apparatus is its availability for packaging different cables on a single mandrel. At present the common practice is to have reels of conductors loaded on a dolly or trailer to be pulled to different jobsites. This requires that a dolly for each reel size to be used in the construction work. Some jobs have as high as four or five different cable sizes, thus requiring four or five different pieces of equipment, such as a dolly or a pickup truck to pull the dolly to the jobsite, for each size of cable. When the required lengths of cable are cut from the reel, the dolly and cable are then returned to a storage area. With the cable dispensing apparatus 108 the reel can be loaded with in excess of six different cable sizes, at least two different cable sizes per reel. Thus, a dolly carrying a cable dispensing apparatus 108 can dispense different sizes of cable at the jobsite, reducing the manpower and time involved with handling four or five different reels and increasing the productivity of the workers at the jobsite.

Although the present invention has been described in considerable detail with reference to certain preferred versions thereof, other versions are possible. Therefore the spirit and scope of the appended claims should not necessarily be limited to the description of the preferred versions contained herein.

What is claimed:

1. A method for simultaneously placing at least three separate cables in a duct at least 500 feet long, the cables being at least as long as the duct and at least about 1¼ inches in diameter, the diameter of the cables being at least about equal to the diameter of the duct, the method comprising the steps of:
   (a) supporting each of the three cables on its own rotatable reel, the cables each being at least 500 feet long;
   (b) placing a guide into the duct, the guide having a body sized to fit within the duct, the body having a plurality of longitudinal channels along its periphery, the channels in cooperation with the internal walls of the duct forming a plurality of spaced apart longitudinally extending cable guide passages, each channel being sufficiently large that a cable can be pulled thorugh each guide passage, the guide having means for continuously introducing a lubricant into each channel at a point located inside of the duct, and in a radially outward direction relative to the longitudinal axis of the duct;
   (c) feeding each of the cables simultaneously and separately from the reels into the guide in the duct;
   (d) pulling the cables simultaneously through the duct via the guide; and
   (e) while feeding and pulling the cables, lubricating the cables, including adjacent surfaces of the cables, by continuously introducing a lubricant through the lubricant introducing means of the guide onto the cables at points located inside of the duct, in radially outward directions relative to the longitudinal axis of the duct.

2. The method of claim 1 wherein the lubricant introducing means comprise a lubricant duct extending longitudinally along the body and at least one hole extending from the lubricant duct to each channel.

3. A method for simultaneously placing at least three separate cables in a duct at least 500 feet long, the cables being at least as long as the duct and at least about 1¼ inches in diameter, the diameter of the cables being at least about equal to the diameter of the duct, the method comprising the steps of:
  (a) supporting each of the three cables on its own rotatable reel, the cables each being at least 500 feet long;
  (b) placing a guide into a duct, the guide having a body sized to fit within the duct, the body having a plurality of longitudinal channels along its periphery, the channels in cooperation with the internal walls of the duct forming a plurality of spaced apart longitudinally extending cable guide passages, each channel being sufficiently large that a cable can be pulled through each guide passage, the guide having means for continuously introducing a lubricant axially into the duct at a point located inside of the duct;
  (c) feeding each of the cables simultaneously and separately from the reels into the guide in the duct;
  (d) pulling the cables simultaneously through the duct via the guide; and
  (e) while feeding and pulling the cables, lubricating the cables, including adjacent surfaces of the cables by continuously introducing a lubricant through the lubricant introducing means of the guide axially into the duct at a point located inside of the duct.

4. The method of claim 3 wherein the lubricant introducing means comprise a lubricant duct extending longitudinally along the body and through the end of the body.

5. A method for simultaneously placing at least three separate cables in a duct at least 500 feet long, the cables being at least as long as the duct and at least about 1¼ inches in diameter, the diameter of the cables being at least about equal to the diameter of the duct, the method comprising the steps of:
  (a) supporting each of the three cables on its own rotatable reel, the cables each being at least 500 feet long;
  (b) placing a guide into the duct before the steps of feeding and pulling, the guide having a body sized to fit within the duct, the body having a plurality of longitudinal channels along its periphery, the channels in cooperation with the internal walls of the duct forming a plurality of spaced apart longitudinally extending cable guide passages, each channel being sufficiently large that a cable can be pulled through each guide passage, the guide having means for continuously introducing a lubricant into each channel at a point located inside of the duct, and in a radially outward direction relative to the longitudinal axis of the duct and axially into the duct at a point located inside of the duct;
  (c) feeding each of the cables simultaneously and separately from the reels into the guide in the duct;
  (d) pulling the cables simultaneously through the duct via the guide; and
  (e) while feeding and pulling the cables, lubricating the cables, including adjacent surfaces of the cables, by continuously introducing a lubricant through the lubricant introducing means of the guide into the duct at points located inside of the duct, (i) in radially outward directions relative to the longitudinal axis of the duct, and (ii) axially into the duct.

6. The method of claim 5 wherein the lubricant introducing means comprise a lubricant duct extending longitudinally along the body and through the end of the body with at least one hole extending from the lubricant duct into each channel.

* * * * *